(12) United States Patent
Guthrie et al.

(10) Patent No.: US 7,081,041 B1
(45) Date of Patent: Jul. 25, 2006

(54) MANUFACTURING METHOD FOR FORMING A WRITE HEAD TOP POLE USING CHEMICAL MECHANICAL POLISHING WITH A DLC STOP LAYER

(75) Inventors: Hung-Chin Guthrie, Saratoga, CA (US); Ming Jiang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/067,913

(22) Filed: Feb. 28, 2005

(51) Int. Cl.
*G11B 5/127* (2006.01)

(52) U.S. Cl. .............................. 451/28; 216/22; 216/38

(58) Field of Classification Search ................. 451/41, 451/28, 29, 30, 36; 29/603.01, 603.07, 603.16; 360/97.01; 216/38, 22
See application file for complete search history.

(56) References Cited

U.S. PATENT DOCUMENTS

| | | | |
|---|---|---|---|
| 5,246,884 A | 9/1993 | Jaso et al. | |
| 5,607,718 A | 3/1997 | Sasaki et al. | |
| 5,674,784 A | 10/1997 | Jang et al. | |
| 5,872,693 A | 2/1999 | Yoda et al. | |
| 6,198,597 B1 | 3/2001 | Tateyama et al. | |
| 6,316,329 B1 | 11/2001 | Hirota et al. | |
| 2001/0042734 A1 | 11/2001 | Beilin et al. | |
| 2002/0084243 A1 | 7/2002 | Hsiao et al. | |
| 2003/0054649 A1 | 3/2003 | Wu et al. | |
| 2003/0080088 A1 | 5/2003 | Kagami et al. | |
| 2003/0090834 A1 | 5/2003 | Kamarajugadda et al. | |
| 2004/0027730 A1 | 2/2004 | Lille | |
| 2004/0106295 A1 | 6/2004 | Cyrille et al. | |
| 2005/0068665 A1* | 3/2005 | Le et al. .................. | 360/97.01 |
| 2005/0177996 A1* | 8/2005 | Yang et al. .............. | 29/603.18 |

* cited by examiner

*Primary Examiner*—Jacob K. Ackun, Jr.
(74) *Attorney, Agent, or Firm*—Chambliss, Bahner & Stophel; David W. Lynch, Esq.

(57) ABSTRACT

A method for forming a write head top pole using chemical mechanical polishing with a diamond-like-carbon (DLC) polishing stop layer is disclosed. The method for providing a top pole of a write head includes forming a P2 pole tip, depositing a P2 filling layer to a P2 target thickness, wherein the P2 filling layer around the P2 pole tip is filled to a P2 target thickness while the P2 filling layer creates a topography above the P2 pole tip, depositing a DLC polishing stop layer over the P2 target thickness filling layer, and chemically mechanically polishing (CMP) any topography above the stop layer-covered P2 target thickness filling layer to the stop layer using a selective slurry.

12 Claims, 7 Drawing Sheets

MANUFACTURING METHOD FOR FORMING A WRITE HEAD TOP POLE USING CHEMICAL MECHANICAL POLISHING WITH A DLC STOP LAYER

BACKGROUND OF THE INVENTION

1. Field of the Invention

The present invention relates generally to chemical mechanical polishing (CMP) top pole fabrication techniques, and more particularly to a method for forming a write head top pole using chemical mechanical polishing with a diamond-like-carbon (DLC) polishing stop layer.

2. Description of Related Art

Fixed magnetic storage systems are now commonplace as a main non-volatile storage in modern personal computers, workstations, and portable computers. Storage systems are now capable of storing gigabyte quantities of digital data, even when implemented in portable computers.

As disk drive technology progresses, more data is compressed into smaller areas. Increasing data density is dependent upon read/write heads fabricated with smaller geometries capable of magnetizing or sensing the magnetization of correspondingly smaller areas on the magnetic disk. The advance in magnetic head technology has led to heads fabricated using processes similar to those used in the manufacture of semiconductor devices.

A typical disk drive is comprised of a magnetic recording medium in the form of a disk for storing information, and a magnetic read/write head for reading or writing information on the disk. The disk rotates on a spindle controlled by a drive motor and the magnetic read/write head is attached to a slider supported above the disk by an actuator arm. When the disk rotates at high speed, a cushion of moving air is formed lifting the air bearing surface (ABS) of the magnetic read/write head above the surface of the disk.

The read portion of the head is typically formed using a magnetoresistive (MR) element. This element is a layered structure with one or more layers of material exhibiting the magnetoresistive effect. The resistance of a magnetoresistive element changes when the element is in the presence of a magnetic field. Data bits are stored on the disk as small, magnetized regions on the disk. As the disk passes by beneath the surface of the magnetoresistive material in the read head, the resistance of the material changes and this change is sensed by the disk drive control circuitry.

The write portion of a read/write head is typically fabricated using a coil embedded in an insulator between a top and bottom magnetic layer. The magnetic layers are arranged as a magnetic circuit, with pole tips forming a magnetic gap at the air bearing surface of the head. When a data bit is to be written to the disk, the disk drive circuitry sends current through the coil creating a magnetic flux. The magnetic layers provide a path for the flux and a magnetic field generated at the pole tips magnetizes a small portion of the magnetic disk, thereby storing a data bit on the disk.

A thin film write head comprises two pole pieces, a top pole P2 and a bottom pole P1. A write head generally has two regions, denoted a pole tip region and a back region. The pole pieces are formed from thin magnetic material films and converge in the pole tip region at a magnetic recording gap, known as the zero throat level, and in the back region at a back gap. The zero throat level delineates the pole tip region and back region. A write head also has pole tip thickness, P1T and P2T, associated with, and extensions of P1 and P2 respectively.

In current magnetic head writer fabrication, P2 is formatted by plating through a photoresist trench, ion milling to a desired write width, filling with alumina, and then planarizing the surface by chemical mechanical polishing (CMP), thereby opening P2 (for connecting to yoke P3). In traditional magnetic head fabrication, the thickness variation sigma from both P2 plating and CMP is such that 0.8 um P2T has to be consumed by CMP to allow opening of all P2. In order to achieve this, an extra 0.8 um of material must be plated over final P2T target of P2, which in turn requires the photoresist thickness to be increased to meet the P2T target. However, increasing the photoresist thickness and trench aspect ratio reduces the photo resolution and the photo process window, thereby resulting in a larger P2 critical dimension sigma. In pole photo processes, such as deep ultraviolet (DUV) photo processes, this high P2T poses further challenges due to its smaller depth of focus compared with lithography exposure tools using I-line wavelength photo processes.

It can be seen then that there is a need for a new method for forming a write head top pole using chemical mechanical polishing with a stop layer.

SUMMARY OF THE INVENTION

To overcome the limitations in the prior art described above, and to overcome other limitations that will become apparent upon reading and understanding the present specification, the present invention discloses a method for forming a write head top pole using chemical mechanical polishing with a stop layer.

An embodiment of the present invention solves the above-described problems forming a top pole with a target thickness using a polishing stop layer to control the chemical mechanical polishing of the filling layer around the top pole.

A method for forming a top pole P2 of a write head in accordance with an embodiment of the present invention includes forming a NiFe P2 pole tip, depositing a P2 filling layer to a target thickness, depositing a stop layer over the P2 target thickness filling layer, and chemically mechanically polishing (CMP) to remove any topography above the stop layer-covered P2 target thickness filling layer to the stop layer using a selective slurry.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

One embodiment of the present invention provides a method for forming a write head top pole using chemical mechanical polishing with a DLC polishing stop layer. The top pole P2 is formed with a target thickness using a stop layer to control the chemical mechanical polishing of the filling layer around the top pole P2.

Figure 1:
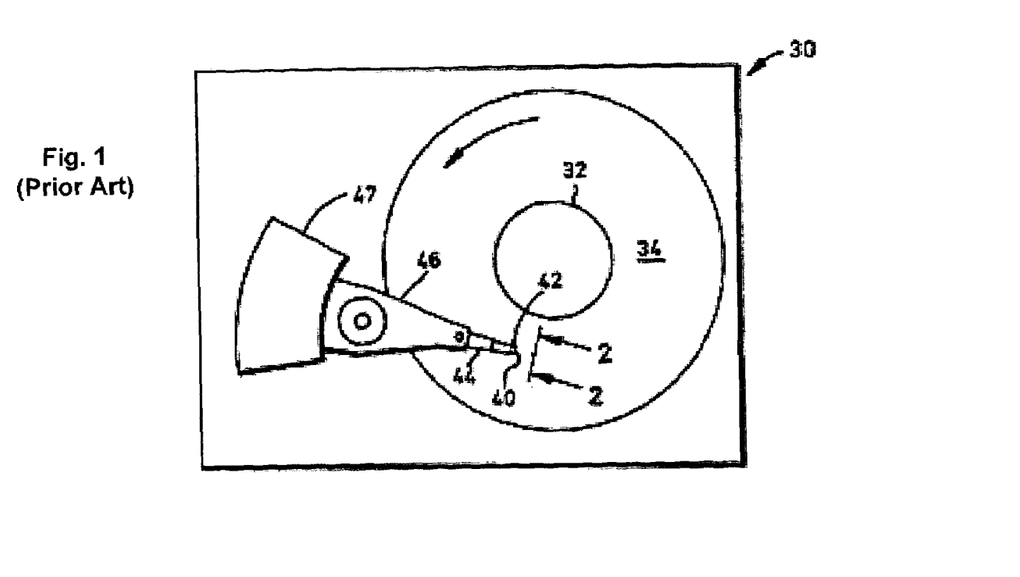
FIG. 1 illustrates a storage system according to the present invention.

FIG. 1 illustrates a storage system 30 according to the present invention. In FIG. 1, a transducer 40 is under control of an actuator 48. The actuator 48 controls the position of the transducer 40. The transducer 40 writes and reads data on magnetic media 34 rotated by a spindle 32. A transducer 40 is mounted on a slider 42 that is supported by a suspension 44 and actuator arm 46. The suspension 44 and actuator arm 46 positions the slider 42 so that the magnetic head 40 is in a transducing relationship with a surface of the magnetic disk 34.

Figure 2:
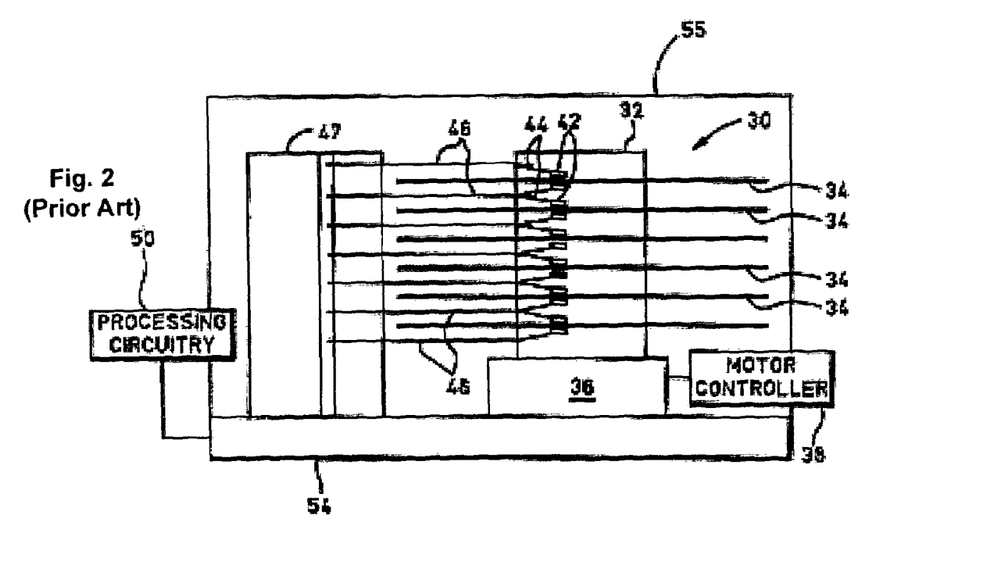
FIG. 2 illustrates one particular embodiment of a storage system according to the present invention.

FIG. 2 illustrates one particular embodiment of a storage system 30 according to the present invention. In FIG. 2, a hard disk drive 30 is shown. The drive 30 includes a spindle 32 that supports and rotates magnetic disks 34. A motor 36, mounted on a frame 54 in a housing 55, which is controlled by a motor controller 38, rotates the spindle 32. A combined read and write magnetic head is mounted on a slider 42 that is supported by a suspension 44 and actuator arm 46. Processing circuitry 50 exchanges signals, representing such information, with the head, provides motor drive signals for rotating the magnetic disks 34, and provides control signals for moving the slider to various tracks. The plurality of disks 34, sliders 42 and suspensions 44 may be employed in a large capacity direct access storage device (DASD).

When the motor 36 rotates the disks 34 the slider 42 is supported on a thin cushion of air (air bearing) between the surface of the disk 34 and the air bearing surface (ABS) 48. The magnetic head may then be employed for writing information to multiple circular tracks on the surface of the disk 34, as well as for reading information therefrom.

Figure 3:
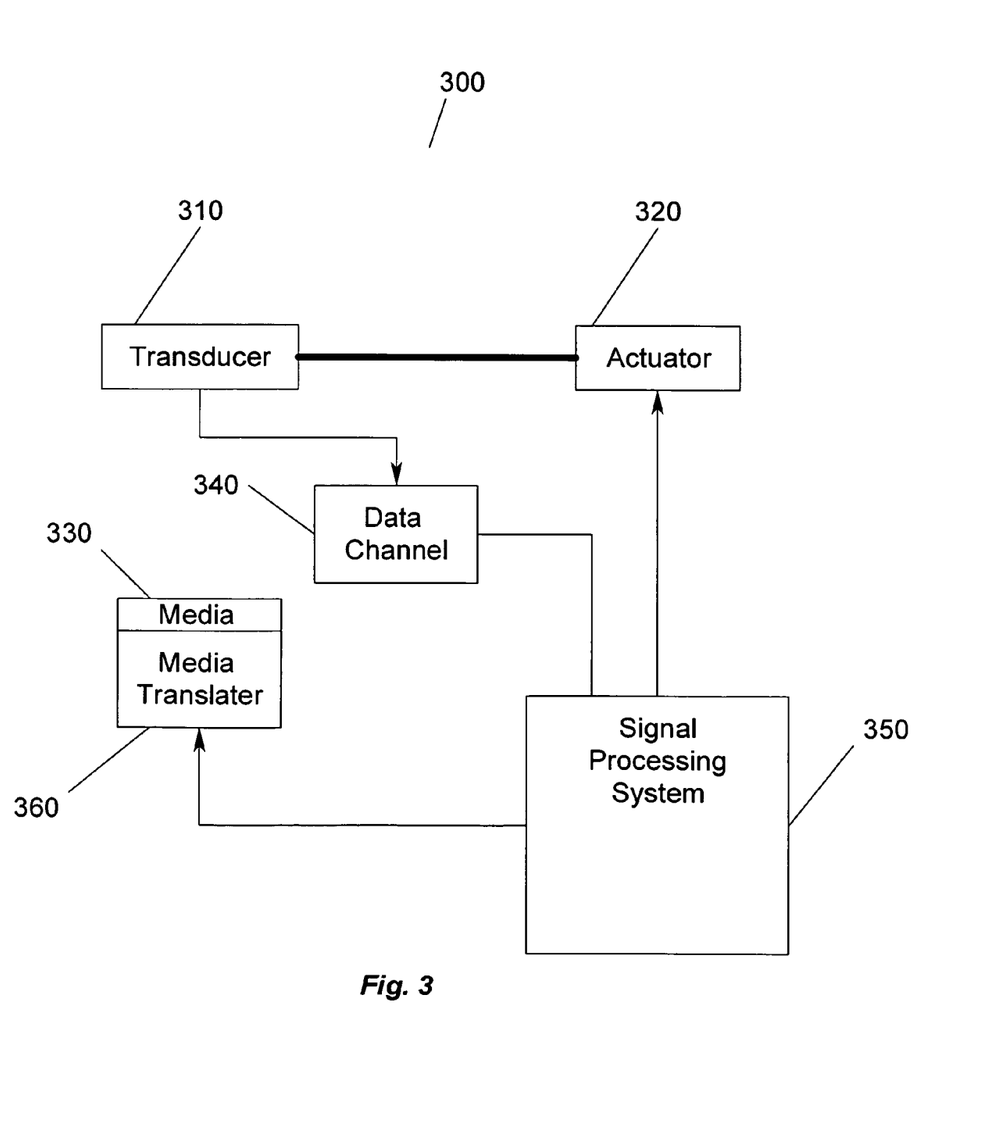
FIG. 3 illustrates a storage system.

FIG. 3 illustrates a storage system 300. In FIG. 3, a transducer 310 is under control of an actuator 320. The actuator 320 controls the position of the transducer 310. The transducer 310 writes and reads data on magnetic media 330. The read/write signals are passed to a data channel 340. A signal processor system 350 controls the actuator 320 and processes the signals of the data channel 340. In addition, a media translator 360 is controlled by the signal processor system 350 to cause the magnetic media 330 to move relative to the transducer 310. Nevertheless, the present invention is not meant to be limited to a particular type of storage system 300 or to the type of media 330 used in the storage system 300.

Figure 4:
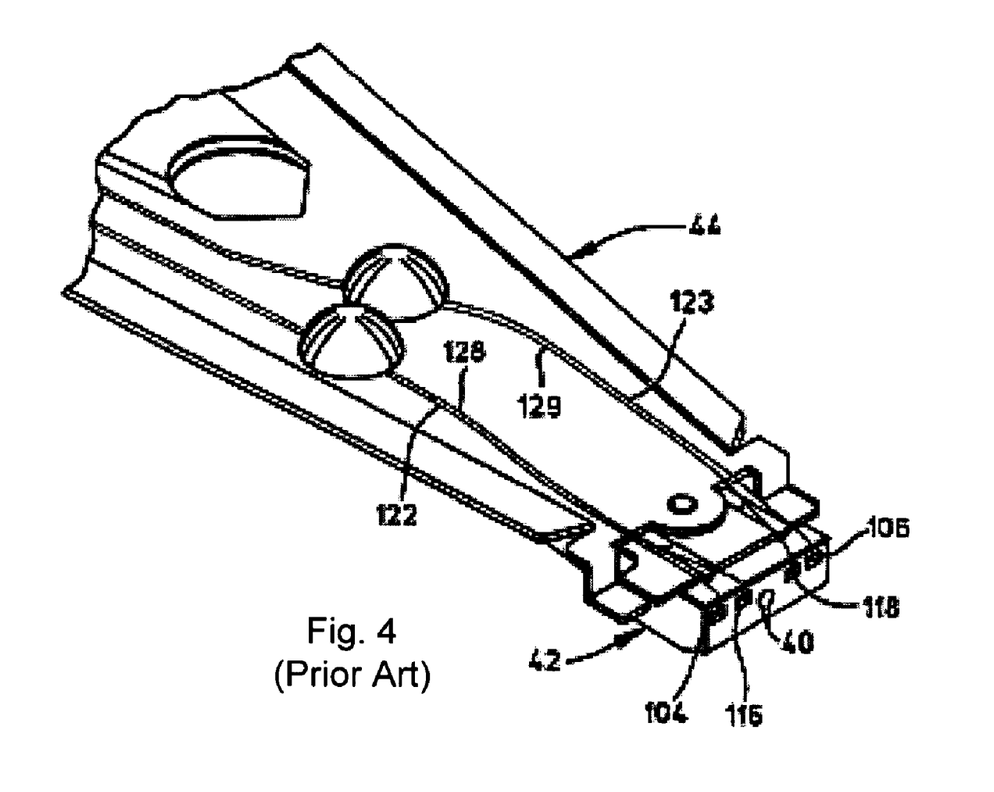
FIG. 4 is an isometric illustration of a suspension system for supporting a slider having a magnetic head mounted thereto.

FIG. 4 is an isometric illustration of a suspension system 400 for supporting a slider 42 having a magnetic head mounted thereto. In FIG. 4 first and second solder connections 104 and 116 connect leads from the sensor 40 to leads 122 and 128 on the suspension 44 and third and fourth solder connections 106 and 118 connect the coil to leads 123 and 129 on the suspension 44. However, the particular locations of connections may vary depending on head design.

Figure 5:
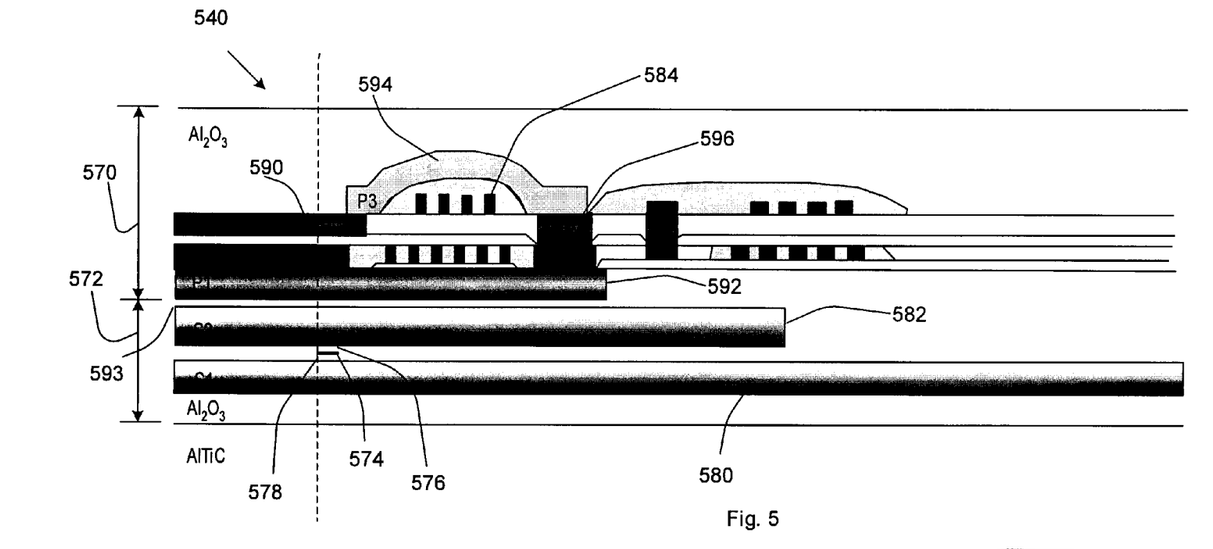
FIGS. 5–7 illustrate a magnetic head according to the prior art.
Figure 6:
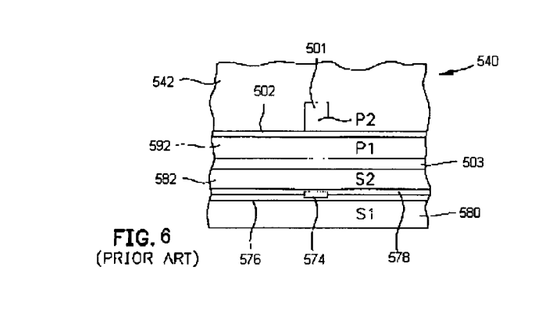
Figure 7:
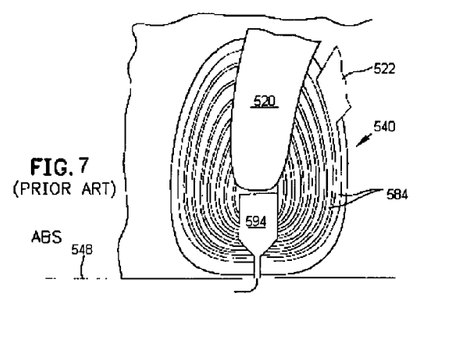

FIGS. 5–7 illustrate a magnetic head according to the prior art. FIGS. 5 and 6 are side cross-sectional elevation view of a magnetic head 540 and an ABS view of the magnetic head 540, respectively. The magnetic head 540 includes a write head portion 570 and a read head portion 572. The read head portion 572 includes a sensor 574. FIG. 6 is an ABS view of the magnetic head of FIG. 5. The sensor 574 is sandwiched between first and second gap layers 576 and 578, and the gap layers are sandwiched between first and second shield layers 580 and 582. In a piggyback head as shown in FIG. 5, the second shield layer (S2) 582 and the first pole piece (P1) 592 are separate layers. The first and second shield layers 580 and 582 protect the MR sensor element 574 from adjacent magnetic fields. More conventionally, the second shield 582 also functions as the first pole (P1) 592 of the write element, giving rise to the term "merged MR head."

In response to external magnetic fields, the resistance of the sensor 574 changes. A sense current is conducted through the sensor causes these resistance changes to be manifested as voltage changes. These voltage changes are then processed as readback signals by the signal processing system 350 shown in FIG. 3.

The write head portion of the magnetic head includes a coil layer 584. P3 594 and P1 592 are magnetically coupled at a back gap 596. A pole tip 590 is coupled to P3 594. A write gap layer 502 separates P2 590 and P1 592 at the ABS. The first pole piece layer 592 is separated from the second shield layer 582 by an insulation layer 503.

FIG. 7 illustrates a view of the connect leads 520, 522 coupled to the coil 584 for the write pole piece 594. As shown in FIGS. 4–7, first and second solder connections 404 and 406 connect leads from the sensor 574 to leads 412 and 414 on the suspension 444, and third and fourth solder connections 416 and 418 connect leads 520 and 522 from the coil 584 (see FIG. 7) to leads 424 and 426 on the suspension.

Figure 8:
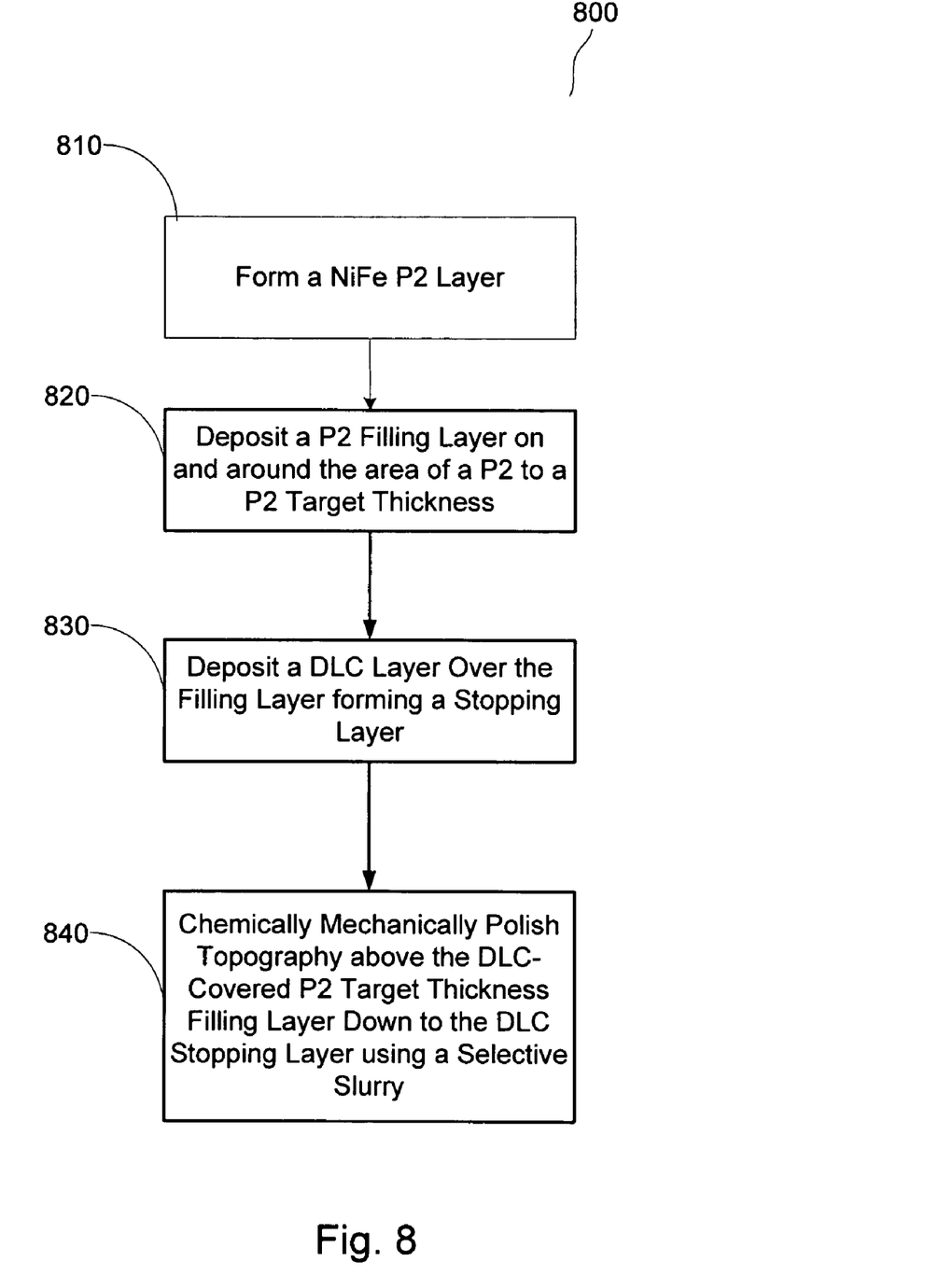
FIG. 8 is a flowchart of a method of fabricating a top pole of a recording head in accordance with embodiments of the invention.

FIG. 8 is a flowchart of a method 800 of fabricating a top pole P2 of a recording head in accordance with embodiments of the invention. A P2 is formed 810. The P2 layer can be formed by plating, for example, and can be formed of NiFe, for example. A P2 filling layer alumina is deposited 820 over the P2 and the area surrounding the P2. The area around P2 is filled to a P2 target thickness. About 200 Å of diamond-like-carbon (DLC) is deposited 830 over the P2 target thickness filling layer, thereby forming a stopping layer. Any topography above the DLC-covered P2 target thickness filling layer is chemically mechanically polished 840 down to the DLC polishing stop layer using a selective slurry resulting in a P2 having a target thickness. The DLC stop layer can be subsequently etched using reactive ion etching (RIE). This novel CMP process using a stop layer and slurry for magnetic head writer fabrication allows for less CMP P2T within-wafer (WIW) and wafer-to-wafer variations, reduces P2T CMP consumption and achieves P2B WIW sigma variation under 10 nm, compared with average WIW sigma of 90 nm in previous production CMP process. According to this embodiment of the invention, P2T consumption is reduced, which enables thinner plating layers and thinner photoresist layers as well as ultimately yielding a 25% NiFe plating time reduction and 60% Alumina fill deposition time reduction.

Figure 9A:
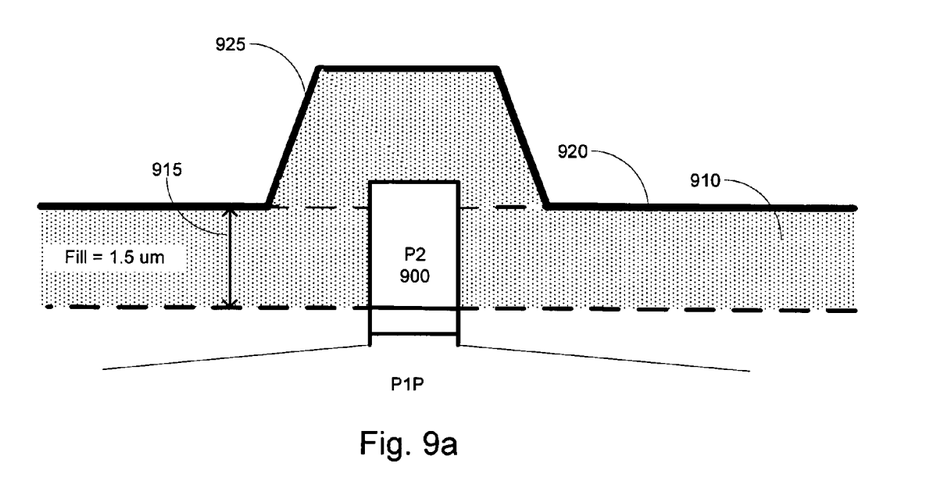
FIGS. 9a and 9b are cross-sectional views of P2 with a fill layer and stopping layer before and after CMP, respectively.
Figure 9B:
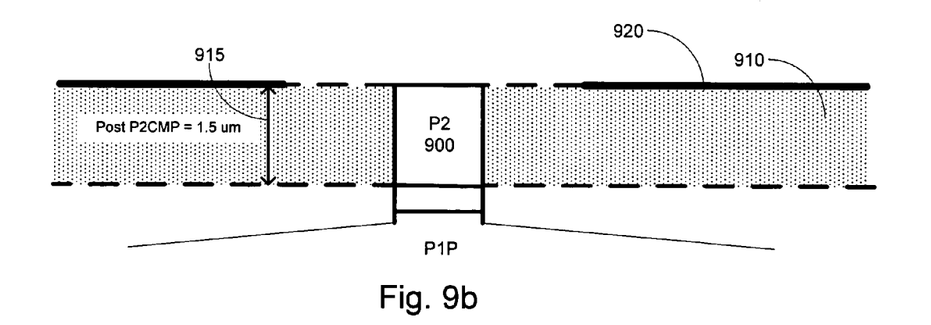

FIGS. 9a and 9b are cross-sectional views of P2 900 with a fill layer 910 and stopping layer 920 before and after CMP, respectively. Fill layer 910 of $Al_2O_3$, for example, is deposited on P2 900 and the area surrounding P2. According to the invention, P2 can be formed to a target thickness or to an approximate target thickness, for example. The fill layer 910 around P2 is deposited to a desired P2 target thickness 915, e.g., 1.5 um. Because the fill layer 910 is deposited on and around P2 900, the area on P2 900 forms a topography 925 with respect to the rest of the fill layer deposited to a desired P2 target thickness 915.

The fill layer 910 is then coated with a polishing stop layer 920, which may be, for example, a diamond-like carbon layer of about 200 Å. Thus, the area surrounding P2 900, but not above P2 900, has a height of the desired P2 target thickness 915 plus the stopping layer 920, while the area above P2 900 has a topography above the target thickness fill layer 910 and stopping layer 920.

When the stop layer-covered area undergoes CMP using a selective slurry, the stop layer and fill layer on the topography 925 is removed. CMP continues until the relief has been removed down to the stopping layer 920 leaving the P2 target thickness 915 plus the thickness of the stopping layer 920. After CMP, the P2 target thickness 915 is achieved (FIG. 9b).

The selective slurry used to remove topography down to the stop layer can be, for example, a Silica/Ammonium Persulfate/Benzotriazole ($SiO_2$/APS/BTA) slurry that has a high selectivity for $Al_2O_3$ removal. The material removal selectivity of $Al_2O_3$ fill material to the stopping layer with SiO2/APS/BTA slurry is 1000:1. The polishing stop layer DLC can be removed using reactive ion etching (RIE).

Figure 10A:
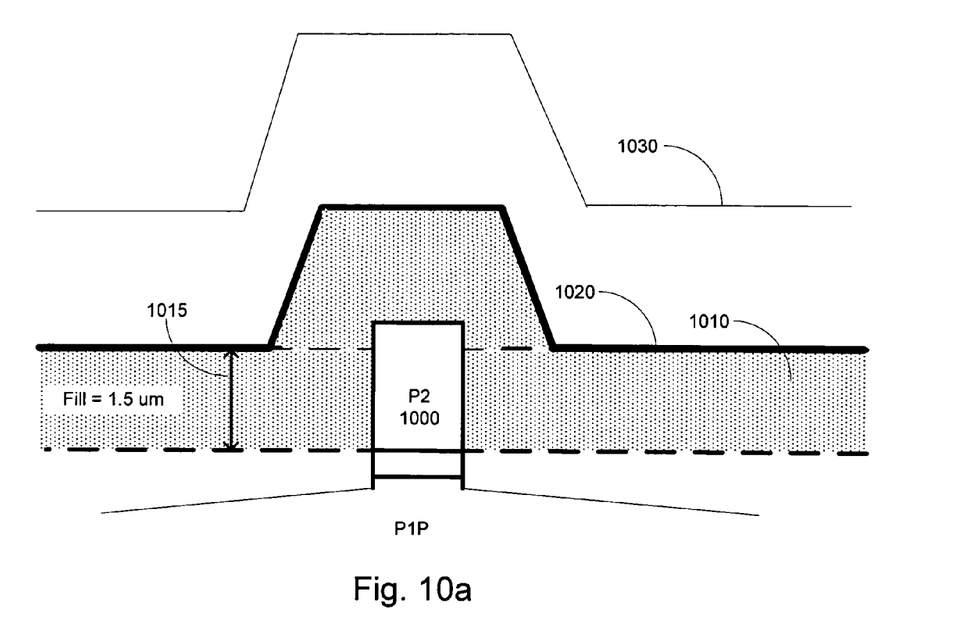
FIGS. 10a and 10b are cross-section views of P2 with a fill layer, stopping layer and another fabrication layer before and after CMP, respectively.
Figure 10B:
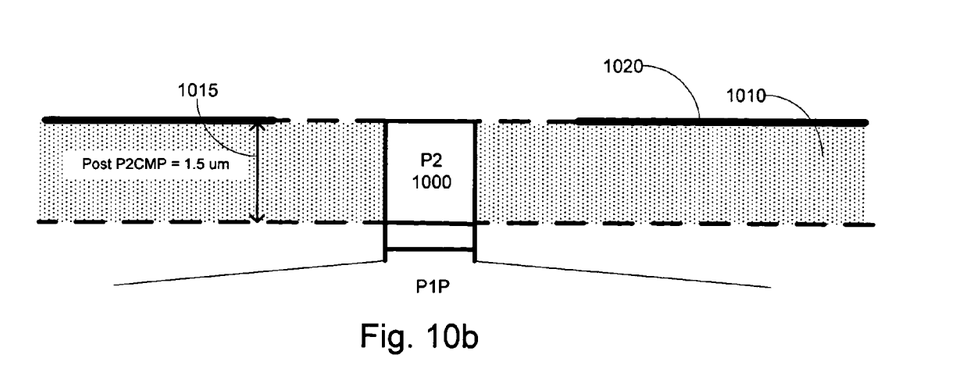

FIGS. 10a and 10b are cross-sectional views of P2 1000 with a fill layer 1010, stopping layer 1020 and another fabrication layer 1030 before and after CMP, respectively. Stop layer may be, for example, a diamond-like carbon layer having a thickness of about 200 Å for example. FIGS. 10a and 10b are similar to FIGS. 9a and 9b, with the filling layer 1010 having a target thickness 1015 and the stopping layer 1020, but an additional layer 1030 is deposited over the stopping layer 1020. —This layer can be used for a variety of purposes including providing an insulation layer in areas near P2. After CMP using a selective slurry, the resulting P2, FIG. 10b, is the same as that in FIG. 9b because the selectivity of the slurry used in accordance with this embodiment of the invention removes the layers above the stopping layer 1020 and results in a P2 with a target thickness.

The foregoing description of the exemplary embodiment of the invention has been presented for the purposes of illustration and description. It is not intended to be exhaustive or to limit the invention to the precise form disclosed.

Many modifications and variations are possible in light of the above teaching. It is intended that the scope of the invention be limited not with this detailed description, but rather by the claims appended hereto.

What is claimed is:

1. A method for fabricating a top pole P2 of a write head comprising:
   forming a P2 pole tip;
   depositing a P2 filling layer to a P2 target thickness, wherein the P2 filling layer around the P2 layer is filled to a P2 target thickness while the P2 filling layer creates a topography above the P2 pole tip;
   depositing a stop layer over the P2 target thickness filling layer; and
   chemically mechanically polishing (CMP) to remove any topography above the stop layer-covered P2 target thickness filling layer to the stop layer using a selective slurry.

2. The method of claim 1, wherein forming the P2 layer comprises forming the P2 pole tip to a P2 target thickness.

3. The method of claim 1, wherein forming the P2 pole tip comprising plating the P2 pole tip.

4. The method of claim 1, wherein the P2 filling layer comprises $Al_2O_3$.

5. The method of claim 1, wherein the chemical mechanical polishing to remove any topography above the stop layer-covered P2 target thickness filling layer to the stop layer comprises chemical mechanical polishing any topography above the stop layer-covered P2 target thickness filling layer to the stop layer at a pressure of 2–4 psi.

6. The method of claim 1, wherein the selective slurry comprises a $SiO_2$/APS/BTA slurry.

7. The method of claim 1, further comprising removing the stop layer after chemical mechanical polishing using reactive ion etching.

8. The method of claim 1, wherein the selective slurry removes the filling layer at a rate of 1000:1 compared to the stop layer.

9. The method of claim 1, wherein the chemical mechanical polishing of any topography above the stop layer-covered P2 target thickness filling layer to the stop layer using a selective slurry comprises chemical mechanical polishing to achieve a wafer sigma variation under 10 nm.

10. The method of claim 1, wherein the depositing a stop layer over the P2 target thickness filling layer further comprises depositing a predetermined amount of a diamond-like-carbon (DLC) material to form the stop layer.

11. The method of claim 10, wherein the depositing a predetermined amount of a diamond-like-carbon (DLC) material to form the stop layer further comprises depositing about 200 Å of diamond-like-carbon (DLC) material.

12. The method of claim 1, wherein the forming a P2 pole tip further comprises depositing a layer of NiFe.

* * * * *